(12) United States Patent
Chen

(10) Patent No.: US 9,371,110 B2
(45) Date of Patent: Jun. 21, 2016

(54) HYDRAULIC BRAKE MASTER CYLINDER

(71) Applicant: Chao Kung Chen, Changhua (TW)

(72) Inventor: Chao Kung Chen, Changhua (TW)

(73) Assignee: Tektro Technology Corporation, Changhua (TW)

(*) Notice: Subject to any disclaimer, the term of this patent is extended or adjusted under 35 U.S.C. 154(b) by 100 days.

(21) Appl. No.: 14/265,366

(22) Filed: Apr. 30, 2014

(65) Prior Publication Data

US 2014/0231203 A1 Aug. 21, 2014

(51) Int. Cl.
*B60T 11/00* (2006.01)
*B62L 3/02* (2006.01)
*B60T 13/00* (2006.01)
*B60T 11/16* (2006.01)

(52) U.S. Cl.
CPC . *B62L 3/023* (2013.01); *B60T 11/16* (2013.01)

(58) Field of Classification Search
CPC ....... B62L 3/023; B60T 11/10; B60T 11/102; B60T 11/16; B60T 11/18; B60T 13/10
See application file for complete search history.

(56) References Cited

U.S. PATENT DOCUMENTS

| 2009/0120751 | A1* | 5/2009 | Lin | B60T 7/10 188/344 |
| 2013/0233659 | A1* | 9/2013 | Moore | B60T 7/108 188/344 |
| 2014/0225364 | A1* | 8/2014 | Tsai | B62L 3/023 285/247 |

FOREIGN PATENT DOCUMENTS

JP 2001260849 A * 9/2001

* cited by examiner

*Primary Examiner* — Melody Burch

(57) ABSTRACT

A hydraulic brake master cylinder is provided. The end of the movable barrel away from the outer convex ring is spaced apart or against the first inner convex flange and to adjust the location of one of two flow-through holes to make the use of brake not be influenced by the oil and air inside the first cylinder while rotating the movable barrel through the disposed outer convex ring. Two elastic plates are plugged in the inner conical portion, the outer convex ring between two ends of the inner connecting member is against the third inner convex flange adjacent to the fifth inner threaded portion, and two elastic plates are pressed by the inner conical portion to be fastened and passed through the second end cap, the second piston, the first piston, and the end of the two elastic plates with a brake cable in series.

4 Claims, 9 Drawing Sheets

HYDRAULIC BRAKE MASTER CYLINDER

BACKGROUND OF THE INVENTION

1. Field of the Invention

The invention relates to bicycle brakes, and more particularly to a hydraulic brake master cylinder.

2. Description of Related Art

The hydraulic brake system used for a bicycle may be seemed to one of the most popular hydraulic devices. It is mainly that a brake master cylinder driven by a handle is arranged at the handlebar and then connected to a brake caliper through a hydraulic line. When the handlebar is pressed by a rider, the piston inside the master cylinder is driven to move forwardly by the handle, and then the oil inside the master cylinder is pushed to the slave cylinder of the caliper. Then, the brake pads are moving toward the brake disc and further the wheel starts to be braked.

However, the brake master cylinder must be arranged adjacent to the handlebar and hard to be adjusted. And it is inconvenient that the two holes with 0.5 mm diameter may not be adjusted after finishing assembly.

Thus, the need for improvement still exists.

SUMMARY OF THE INVENTION

It is therefore one object of the invention to provide a hydraulic brake master cylinder. The end of the movable barrel away from the outer convex ring may be spaced apart or against the first inner convex flange and further to adjust the location of one of two flow-through holes to make the use of brake not be influenced by the oil and air inside the first cylinder while rotating the movable barrel through the disposed outer convex ring. In addition, two elastic plates are plugged in the inner conical portion, the outer convex ring between two ends of the inner connecting member is against the third inner convex flange adjacent to the fifth inner threaded portion, and two elastic plates are pressed by the inner conical portion to be fastened and passed through the second end cap, the second piston, the first piston, and the end of the two elastic plates with a brake cable in series to form a central pull structure. Furthermore, the oil pressure may be adjusted by moving the first piston with the brake cable and the position of the brake master cylinder may be adjusted according to user's request.

In one aspect of the invention a hydraulic brake master cylinder comprises a body, having a first cylinder, a first inner threaded portion and a second threaded portion are respectively arranged at two ends of the first cylinder, and the first cylinder includes a first inner convex flange adjacent to the first inner threaded portion and a second inner convex flange adjacent to the second inner threaded portion; a movable barrel, passed through the first cylinder of the body, an outer convex ring disposed externally of the first cylinder is radially and outwardly projected at one side of the movable barrel, a first outer threaded portion is arranged on an outer surface adjacent to the outer convex ring, a fourth inner threaded portion is arranged on an inner surface adjacent to the outer convex ring, the first outer threaded portion is rotatably and adjustably connected with the first inner threaded portion of the first cylinder, the fourth inner threaded portion is screwed with a fourth outer threaded portion of a first end cap, and the movable barrel further includes two flow-through holes relatively arranged and located between two ends of the movable barrel; a first piston, having a large-diameter section and a small-diameter section connected with each other, the large-diameter section is inserted inside the movable barrel and the small-diameter section is disposed externally of the movable barrel, and the connection of the large-diameter section and the small-diameter section is against the first end cap; and a second piston, one end thereof is plugged in the end of the large-diameter section of the first piston away from the small-diameter section, and the other end thereof is plugged in the second inner convex flange of the first cylinder and adjacent to the second inner threaded portion, a second outer threaded portion of a second end cap is rotatably and adjustably screwed with the second inner threaded portion of the first cylinder and against one end of the second piston adjacent to the second inner threaded portion; wherein an elastic member is sleeved on the second piston and two end thereof are respectively against the large-diameter section of the first piston and the first inner convex flange, and the end of the movable barrel relative to the end having the outer convex ring is spaced apart or against the first inner convex flange and further adjusting the position of one of the two flow-through holes while rotating the movable barrel through the disposed outer convex ring.

In another aspect of the invention a hydraulic brake master cylinder comprises a body, having a first cylinder and a second cylinder, a first inner threaded portion and a second threaded portion are respectively arranged at two ends of the first cylinder, a third inner threaded portion screwed with an third outer threaded portion of an end cap is arranged at the end of the second cylinder adjacent to the first inner threaded portion, and the first cylinder includes a first inner convex flange adjacent to the first inner threaded portion and a second inner convex flange adjacent to the second inner threaded portion; a movable barrel, passed through the first cylinder of the body, an outer convex ring disposed externally of the first cylinder is radially and outwardly projected at one side of the movable barrel, a first outer threaded portion is arranged on an outer surface adjacent to the outer convex ring, a fourth inner threaded portion is arranged on an inner surface adjacent to the outer convex ring, the first outer threaded portion is rotatably and adjustably connected with the first inner threaded portion of the first cylinder, the fourth inner threaded portion is screwed with a fourth outer threaded portion of a first end cap, and the movable barrel further includes two flow-through holes relatively arranged and located between two ends of the movable barrel; a first piston, having a large-diameter section and a small-diameter section connected with each other, the large-diameter section is inserted inside the movable barrel and the small-diameter section is disposed externally of the movable barrel, and the connection of the large-diameter section and the small-diameter section is against the first end cap; and a second piston, one end thereof is plugged in the end of the large-diameter section of the first piston away from the small-diameter section, and the other end thereof is plugged in the second inner convex flange of the first cylinder and adjacent to the second inner threaded portion, a second outer threaded portion of a second end cap is rotatably and adjustably screwed with the second inner threaded portion of the first cylinder and against one end of the second piston adjacent to the second inner threaded portion; wherein an elastic member is sleeved on the second piston and two end thereof are respectively against the large-diameter section of the first piston and the first inner convex flange, and the end of the movable barrel relative to the end having the outer convex ring is spaced apart or against the first inner convex flange and further adjusting the position of one of the two flow-through holes to align with the connection of the first cylinder and the second cylinder while rotating the movable barrel through the disposed outer convex ring.

The above and other objects, features and advantages of the invention will become apparent from the following detailed description taken with the accompanying drawings.

DETAILED DESCRIPTION OF THE INVENTION

Figure 1:
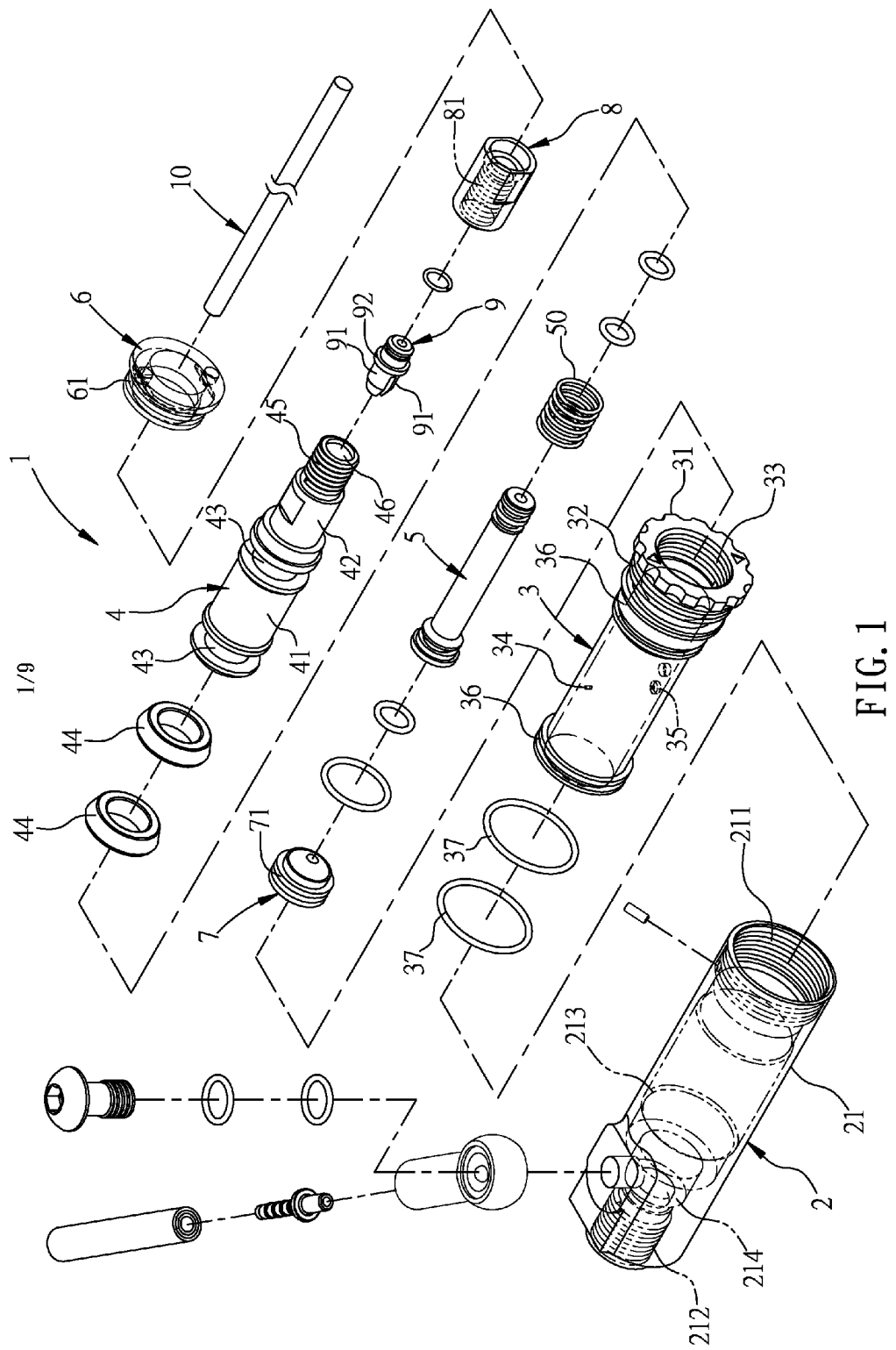
FIG. 1 is an exploded view of a first embodiment of a hydraulic brake master cylinder according to the invention.
Figure 2:
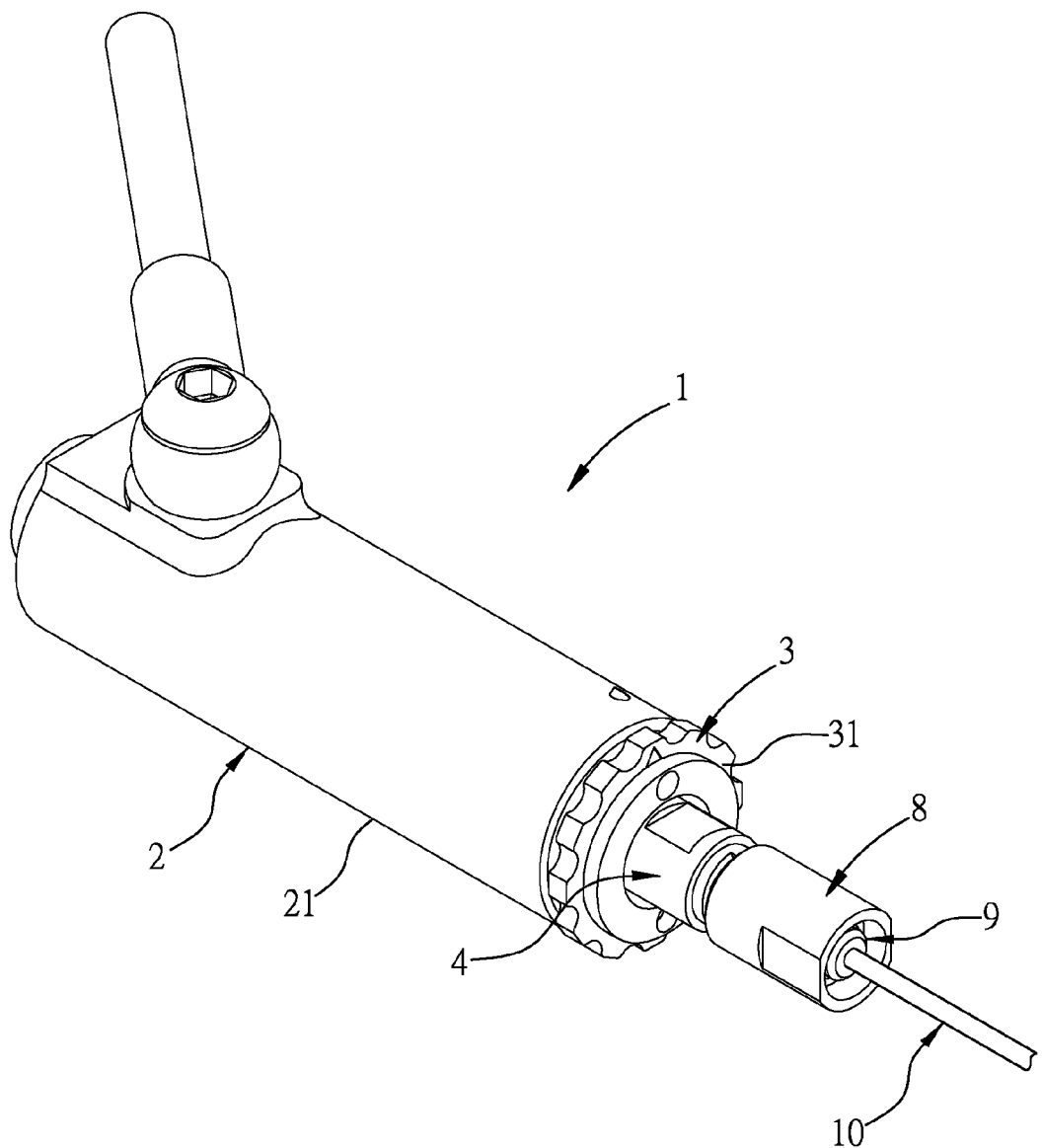
FIG. 2 is a perspective view of the first embodiment of the hydraulic brake master cylinder according to the invention.
Figure 3:
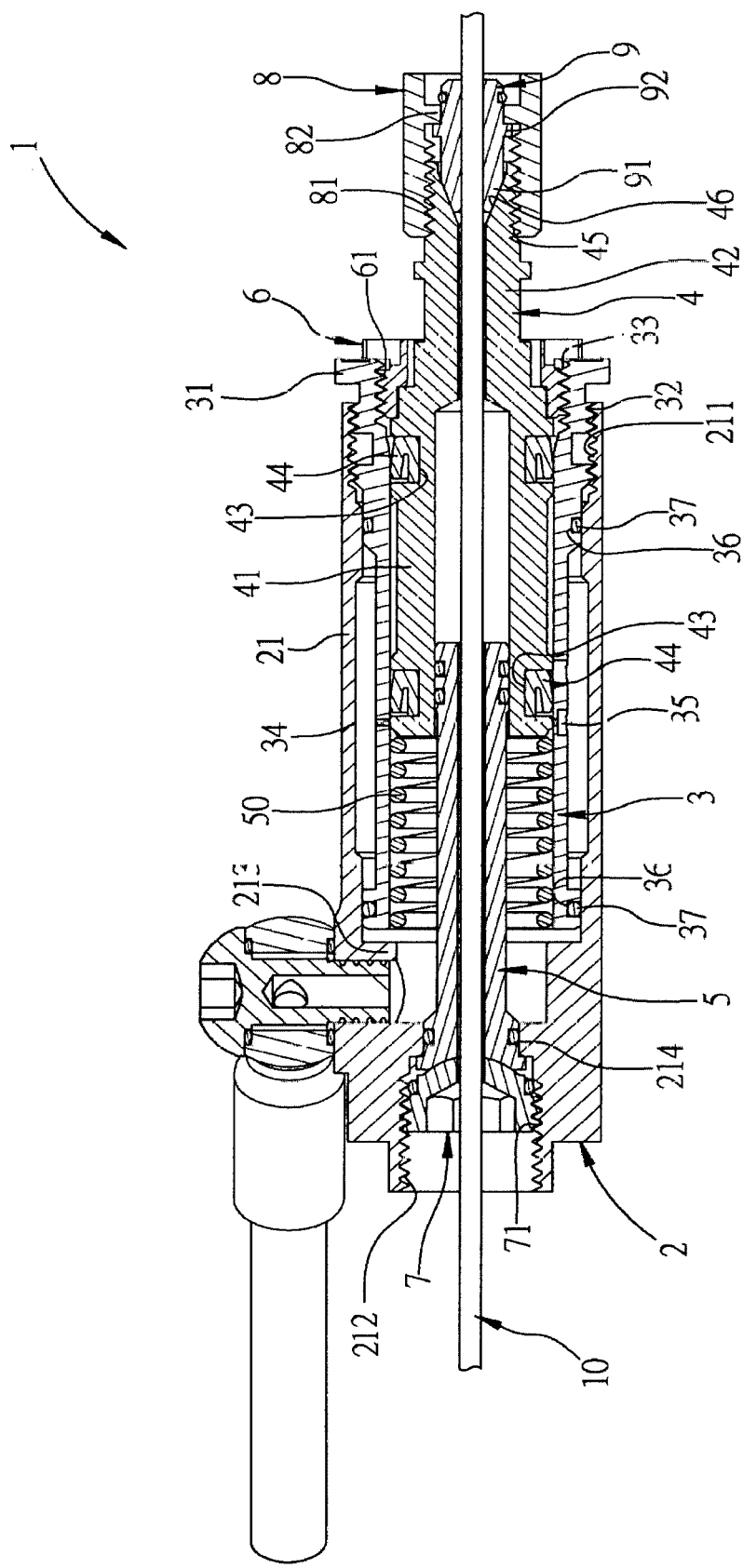
FIG. 3 is a cross sectional view of the first embodiment of the hydraulic brake master cylinder according to the invention.

Referring to FIGS. 1 to 3, a hydraulic brake master cylinder 1 in accordance with a first preferred embodiment of the invention comprises a body 2, a movable barrel 3, a first piston 4 and a second piston 5 as discussed in detail below.

The body 2 may have a first cylinder 21. A first inner threaded portion 211 and a second threaded portion 212 are respectively arranged at two ends of the first cylinder 21. The first cylinder 21 may include a first inner convex flange 213 adjacent to the second inner threaded portion 212 and a second inner convex flange 214 between the first inner convex flange 213 and the second inner threaded portion 212.

The movable barrel 3 may be passed through the first cylinder 21 of the body 2. An outer convex ring 31 disposed externally of the first cylinder 21 is radially and outwardly projected at one side of the movable barrel 3. A first outer threaded portion 32 may be arranged on an outer surface adjacent to the outer convex ring 31. A fourth inner threaded portion 33 may be arranged on an inner surface adjacent to the outer convex ring 31. The first outer threaded portion 32 may be rotatably and adjustably connected with the first inner threaded portion 211 of the first cylinder 21 and the adjustable movement may be 1 mm. The fourth inner threaded portion 33 may be screwed with a fourth outer threaded portion 61 of a first end cap 6. And the movable barrel 3 may be further include two flow-through holes 34 and 35 (with 0.5 mm diameter) relatively arranged and located between two ends of the movable barrel 3. Two concave ring grooves 36 may be respectively arranged at the locations of the movable barrel 3 adjacent to and away from the first outer threaded portion 32, and an O-ring 37 may be provided to sleeve on each concave ring groove 36.

The first piston 4 may have a large-diameter section 41 and a small-diameter section 42 connected with each other. The large-diameter section 41 may be inserted inside the movable barrel 3 and the small-diameter section 42 may be disposed externally of the movable barrel 3. And the connection of the large-diameter section 41 and the small-diameter section 42 is against the first end cap 6. Two concave ring grooves 43 may be respectively arranged at two ends of the large-diameter section 41 of the first piston 4, and a V-ring 44 may be provided to sleeve on each concave ring groove 43.

One end of the second piston 5 may be plugged in the end of the large-diameter section 41 of the first piston 4 away from the small-diameter section 42, and the other end of the second piston 5 may be plugged in the second inner convex flange 214 of the first cylinder 21 and adjacent to the second inner threaded portion 212. A second outer threaded portion 71 of a second end cap 7 may be rotatably and adjustably screwed with the second inner threaded portion 212 of the first cylinder 21 and against one end of the second piston 5 adjacent to the second inner threaded portion 212. An elastic member 50 may be sleeved on the second piston 5, and two ends of the elastic member 50 may be respectively against the large-diameter section 41 of the first piston 4 and the first inner convex flange 213 of the first cylinder 21.

Therefore, the end of the movable barrel 3 away from the outer convex ring 31 may be spaced apart or against the first inner convex flange 213 and further to adjust the location of one of two flow-through holes 34 and 35 to make the use of brake not be influenced by the oil and air inside the first cylinder 21 while rotating the movable barrel 3 through the disposed outer convex ring 31.

In addition, a fifth outer threaded portion 45 may be arranged at the end of the small-diameter section 42 of the first piston 4 away from the large-diameter section 41. And an inner surface of the small-diameter section 42 having the fifth outer threaded portion is formed an inner conical portion 46. A fifth inner threaded portion 81 of an outer barrel 8 may be screwed with the fifth outer threaded portion 45. A third convex flange 82 may be arranged inside the end of the outer barrel 8 away from the fifth inner threaded portion 81.

Two elastic plates 91 of an inner connecting member 9 may be plugged in the inner conical portion 46. An outer convex ring 92 arranged between two ends of the inner connecting member 9 is against the third inner convex flange 82 adjacent to the fifth inner threaded portion 81, and the two elastic plates 91 may be pressed by the inner conical portion 46 to be fastened and passed through the first piston 4, and the end of the two elastic plates 91 with a brake cable 10 in series to form a central pull structure. Furthermore, the oil pressure may be adjusted by moving the first piston 4 with the brake cable 10 and the position of the brake master cylinder 1 may be adjusted according to user's request.

Figure 4:
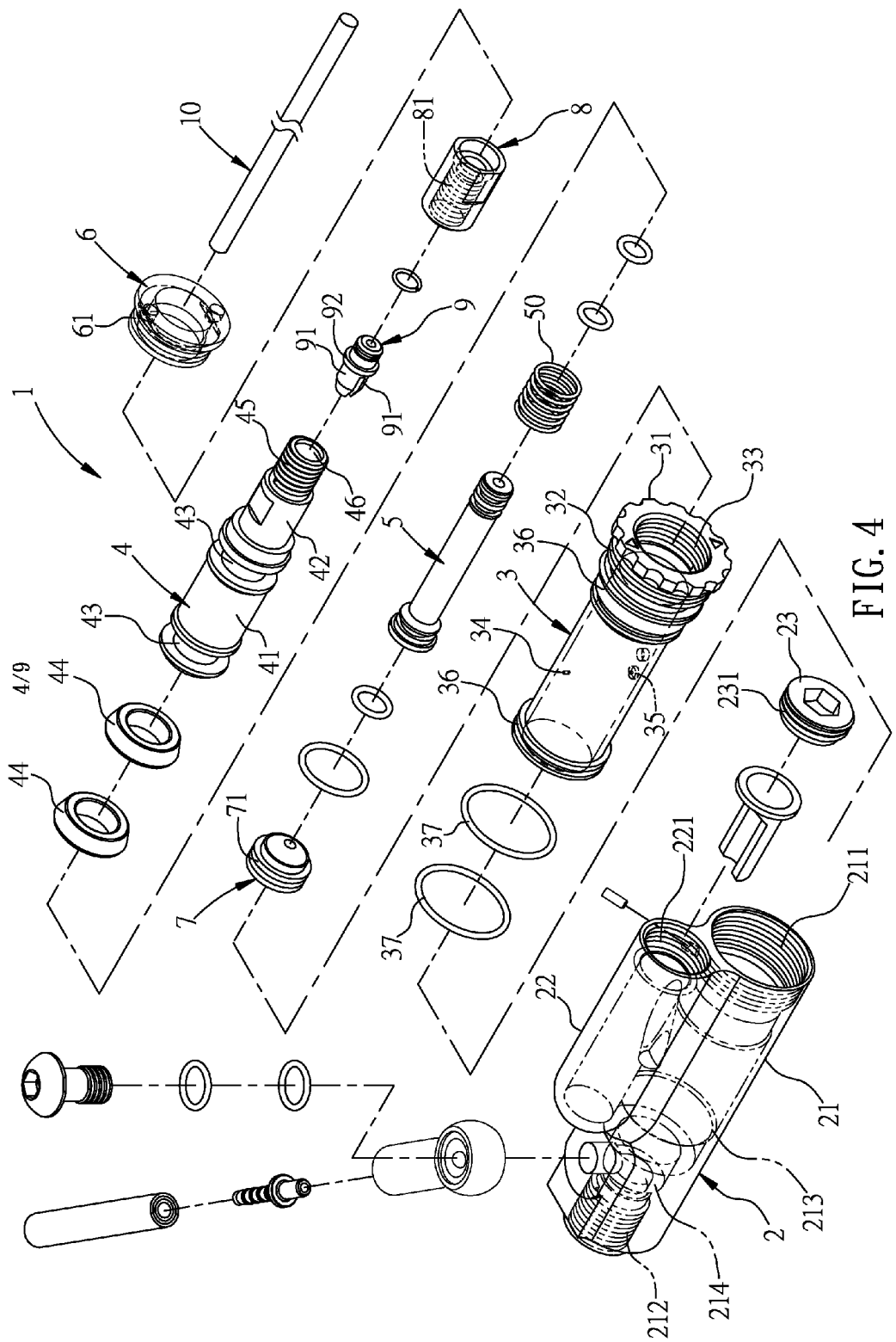
FIG. 4 is an exploded view of a second embodiment of the hydraulic brake master cylinder according to the invention.
Figure 5:
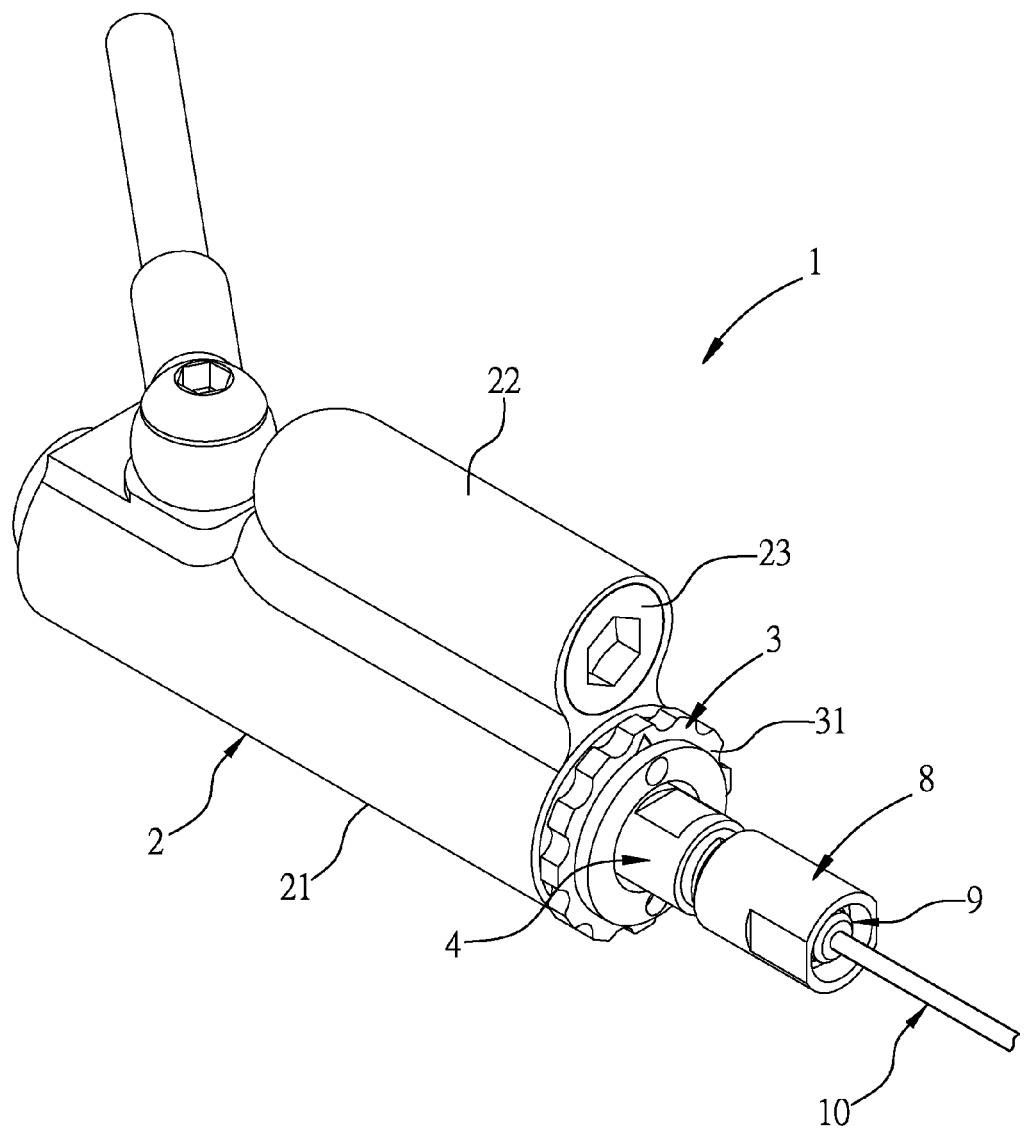
FIG. 5 is a perspective view of the second embodiment of the hydraulic brake master cylinder according to the invention.
Figure 6:
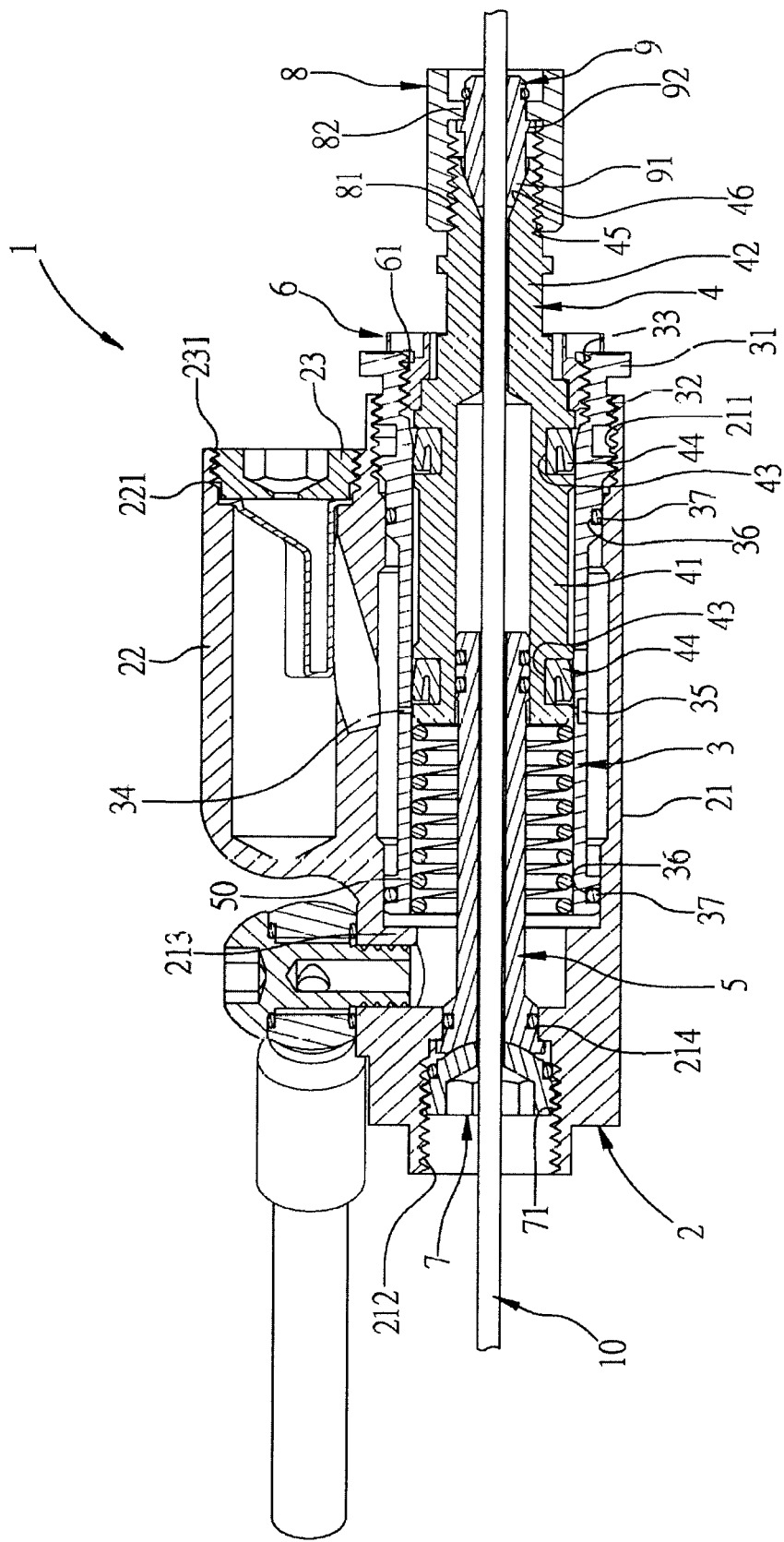
FIG. 6 is a cross sectional view of the second embodiment of the hydraulic brake master cylinder according to the invention.

Referring to FIGS. 4 to 6, a hydraulic brake master cylinder 1 in accordance with a second preferred embodiment of the invention is shown. The characteristics of the second preferred embodiment are discussed in detail below. The hydraulic brake master cylinder 1 may comprise a body 2, a movable barrel 3, a first piston 4 and a second piston 5.

The body 2 may have a first cylinder 21 and a second cylinder 22. A first inner threaded portion 211 and a second threaded portion 212 are respectively arranged at two ends of the first cylinder 21. A third inner threaded portion 221 screwed with an third outer threaded portion 231 of an end cap 23 is arranged at the end of the second cylinder 22 adjacent to the first inner threaded portion 211. And the first cylinder 21 may include a first inner convex flange 213 adjacent to the first inner threaded portion 211 and a second inner convex flange 214 adjacent to the second inner threaded portion 212.

The movable barrel 3 may be passed through the first cylinder 21 of the body 2. An outer convex ring 31 disposed externally of the first cylinder 21 is radially and outwardly projected at one side of the movable barrel 3. A first outer threaded portion 32 may be arranged on an outer surface adjacent to the outer convex ring 31. A fourth inner threaded portion 33 may be arranged on an inner surface adjacent to the outer convex ring 31. The first outer threaded portion 32 may be rotatably and adjustably connected with the first inner threaded portion 211 of the first cylinder 21 and the adjustable movement may be 1 mm. The fourth inner threaded portion 33 may be screwed with a fourth outer threaded portion 61 of a first end cap 6. And the movable barrel 3 may be further include two flow-through holes 34 and 35 (with 0.5 mm diameter) relatively arranged and located between two ends of the movable barrel 3.

Two concave ring grooves 36 may be respectively arranged at the locations of the movable barrel 3 adjacent to and away from the first outer threaded portion 32, and an O-ring 37 may be provided to sleeve on each concave ring groove 36. The first piston 4 may have a large-diameter section 41 and a small-diameter section 42 connected with each other. The large-diameter section 41 may be inserted inside the movable barrel 3 and the small-diameter section 42 may be disposed externally of the movable barrel 3. And the connection of the large-diameter section 41 and the small-diameter section 42 is against the first end cap 6.

Two concave ring grooves 43 may be respectively arranged at two ends of the large-diameter section 41 of the first piston 4, and a V-ring 44 may be provided to sleeve on each concave ring groove 43. One end of the second piston 5 may be plugged in the end of the large-diameter section 41 of the first piston 4 away from the small-diameter section 42, and the other end of the second piston 5 may be plugged in the second inner convex flange 214 of the first cylinder 21 and adjacent to the second inner threaded portion 212. A second outer threaded portion 71 of a second end cap 7 may be rotatably and adjustably screwed with the second inner threaded portion 212 of the first cylinder 21 and against one end of the second piston 5 adjacent to the second inner threaded portion 212.

An elastic member 50 may be sleeved on the second piston 5, and two ends of the elastic member 50 may be respectively against the large-diameter section 41 of the first piston 4 and the first inner convex flange 213 of the first cylinder 21. Therefore, the end of the movable barrel 3 away from the outer convex ring 31 may be spaced apart or against the first inner convex flange 213 and further to adjust the location of one of two flow-through holes 34 and 35 to make the use of brake not be influenced by the oil and air inside the first cylinder 21 while rotating the movable barrel 3 through the disposed outer convex ring 31.

Besides, the brake cable 10, the first cylinder 21, the first piston 4, and the second piston 5 may be coaxially arranged. In addition, a fifth outer threaded portion 45 may be arranged at the end of the small-diameter section 42 of the first piston 4 away from the large-diameter section 41. And an inner surface of the small-diameter section 42 having the fifth outer threaded portion is formed an inner conical portion 46. A fifth inner threaded portion 81 of an outer barrel 8 may be screwed with the fifth outer threaded portion 45. A third convex flange 82 may be arranged inside the end of the outer barrel 8 away from the fifth inner threaded portion 81.

Two elastic plates 91 of an inner connecting member 9 may be plugged in the inner conical portion 46. An outer convex ring 92 arranged between two ends of the inner connecting member 9 is against the third inner convex flange 82 adjacent to the fifth inner threaded portion 81, and the two elastic plates 91 may be pressed by the inner conical portion 46 to be fastened and passed through the first piston 4, and the end of the two elastic plates 91 with a brake cable 10 in series to form a central pull structure. Furthermore, the oil pressure may be adjusted by moving the first piston 4 with the brake cable 10 and the position of the brake master cylinder 1 may be adjusted according to user's request.

Figure 7:
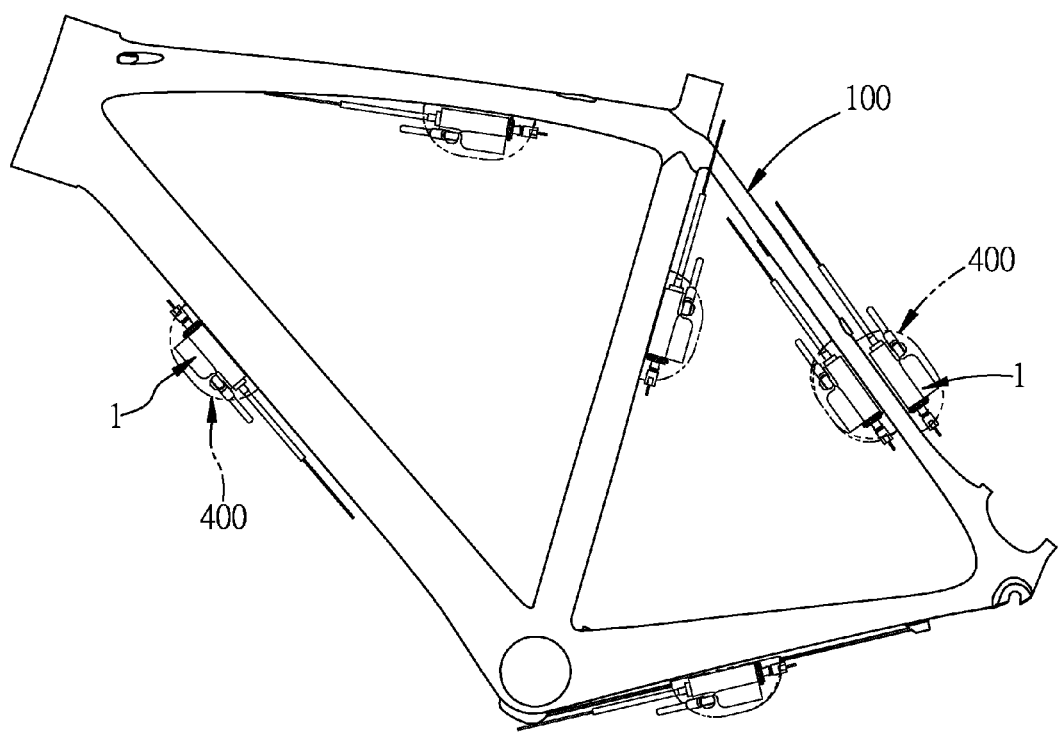
FIG. 7 is a schematic diagram of the hydraulic brake master cylinder according to the invention arranged at a predetermined position of a frame of a bicycle.
Figure 8:
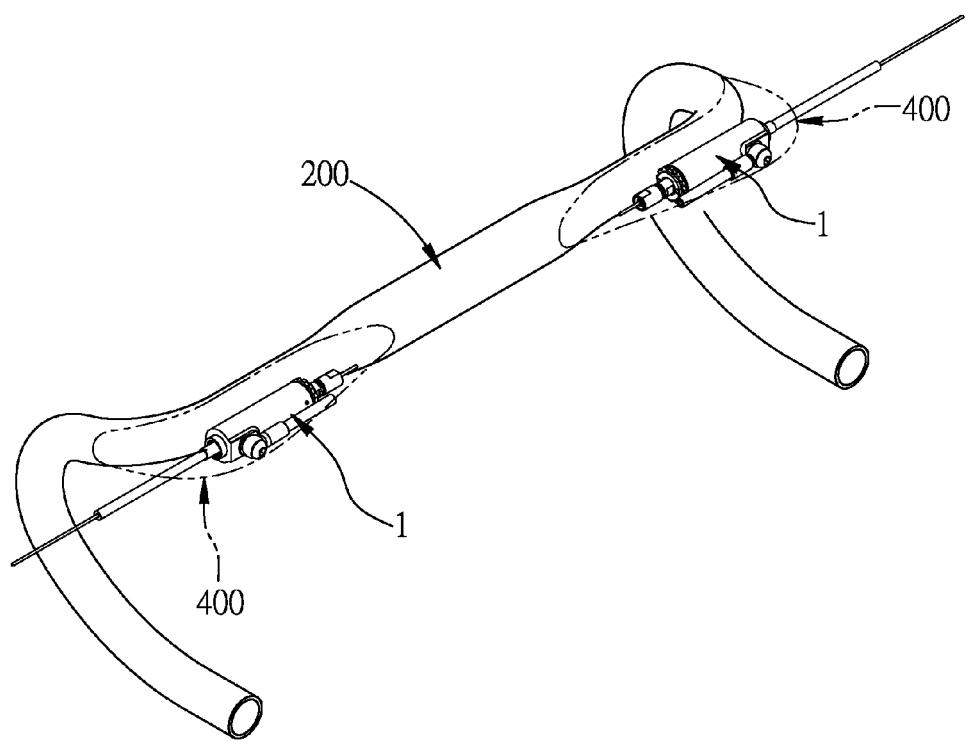
FIG. 8 is a schematic diagram of the hydraulic brake master cylinder according to the invention arranged at the handlebar of the bicycle.
Figure 9:
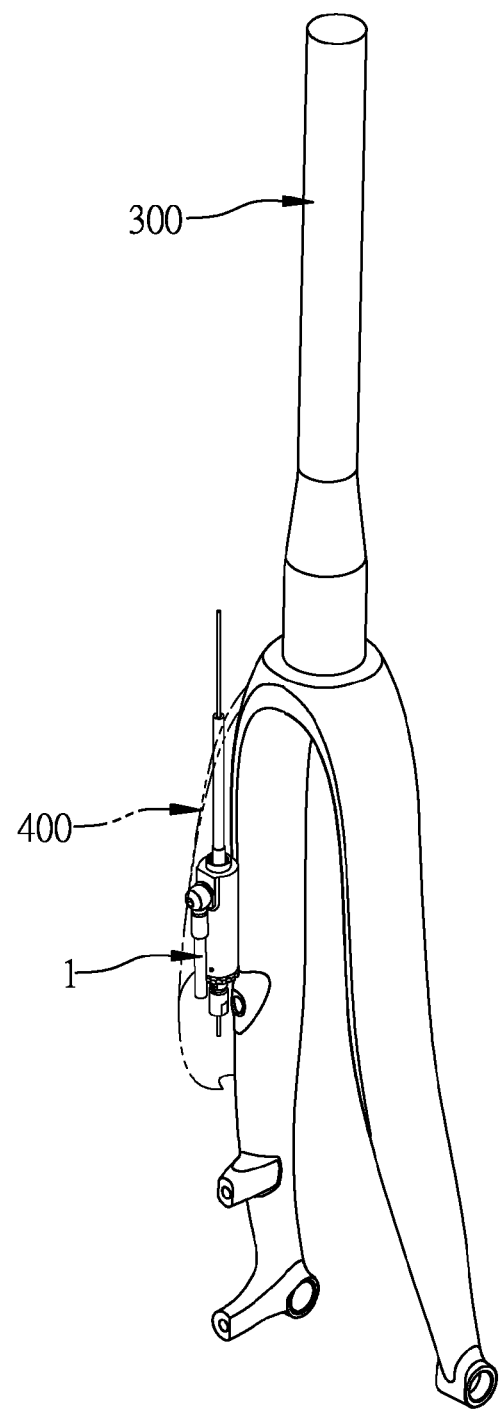
FIG. 9 is a schematic diagram of the hydraulic brake master cylinder according to the invention arranged at the front fork of the bicycle.

Referring to FIGS. 7 to 9, the hydraulic brake master cylinder 1 of the invention may be arranged at any position of a bicycle, such as a predetermined position of the frame 100 (shown in FIG. 7), the handlebar 200 (shown in FIG. 8), or the front fork 300 (shown in FIG. 9) of the bicycle. Meanwhile, the hydraulic brake master cylinder 1 may be covered by a detachable cover 400 with a color the same as the frame 100, the handlebar 200 or the front fork 300 to achieve the effective of hiding.

While the invention has been described in terms of preferred embodiments, those skilled in the art will recognize that the invention can be practiced with modifications within the spirit and scope of the appended claims.

What is claimed is:

1. A hydraulic brake master cylinder, comprising:
   a body including a first cylinder, a first inner threaded portion, and a second inner threaded portion wherein the first inner threaded portion and the second threaded portion are arranged at two ends of the first cylinder respectively, and the first cylinder includes a first inner convex flange adjacent to the second inner threaded portion, and a second inner convex flange between the first inner convex flange and the second inner threaded portion;
   a movable barrel passing through the first cylinder of the body;
   an outer convex ring disposed externally of the first cylinder, the outer convex ring radially and outwardly projected at one side of the movable barrel;
   a first outer threaded portion arranged on an outer surface adjacent to the outer convex ring;
   a fourth inner threaded portion arranged on an inner surface adjacent to the outer convex ring wherein the first outer threaded portion is rotatably and adjustably connected with the first inner threaded portion of the first cylinder, the fourth inner threaded portion is screwed with a fourth outer threaded portion of a first end cap, and the movable barrel further includes two flow-through holes relatively arranged and located between two ends of the movable barrel;
   a first piston including a large-diameter section and a small-diameter section connected with each other wherein the large-diameter section is inserted inside the movable barrel, the small-diameter section is disposed externally of the movable barrel, and both the connection of the large-diameter section and the small-diameter section urge against the first end cap;
   a second piston having one end plugged In the end of the large-diameter section of the first piston away from the small-diameter section, and an other end plugged in the second inner convex flange of the first cylinder adjacent to the second inner threaded portion;
   a second end cap including a second outer threaded portion rotatably and adjustably screwed with the second inner threaded portion of the first cylinder and urged against one end of the second piston adjacent to the second inner threaded portion; and
   an elastic member sleeved on the second piston and having two ends urged against the large-diameter section of the first piston and the first inner convex flange respectively;

wherein the end of the movable barrel away from the outer convex ring is spaced apart or urged against the first inner convex flange so that it is configured to further adjust the position of one of the two flow-through holes while rotating the movable barrel through the outer convex ring.

2. The hydraulic brake master cylinder of claim 1, wherein two concave ring grooves are arranged at locations of the movable barrel adjacent to and away from the first outer threaded portion respectively, and further comprising two O-rings sleeved on the concave ring grooves respectively.

3. The hydraulic brake master cylinder of claim 1, wherein two concave ring grooves are arranged at two ends of the large-diameter section of the first piston respectively, and further comprising two V-rings sleeved on the concave ring grooves respectively.

4. The hydraulic brake master cylinder of claim 1, further comprising a fifth outer threaded portion arranged at the end of the small-diameter section of the first piston away from the large-diameter section wherein an inner surface of the small-diameter section having the fifth outer threaded portion is formed with an inner conical portion, an outer barrel including a fifth inner threaded portion screwed with the fifth outer threaded portion, a third convex flange arranged inside the end of the outer barrel away from the fifth inner threaded portion, an inner connecting member including two elastic plates plugged in the inner conical portion, and an outer convex ring arranged between two ends of the inner connecting member urged against the third inner convex flange adjacent to the fifth inner threaded portion wherein the elastic plates are pressed by the inner conical portion to be fastened and passed through the second end cap, the second piston, the first piston, and the end of the two elastic plates with a brake cable in series.

* * * * *